(12) United States Patent
Hampel (10) Patent No.: US 9,699,274 B2
(45) Date of Patent: Jul. 4, 2017

(54) METHOD AND APPARATUS FOR RELIABLE SESSION MIGRATION

(75) Inventor: Karl Georg Hampel, New York, NY (US)

(73) Assignee: Alcatel Lucent, Boulogne-BIllancourt (FR)

( * ) Notice: Subject to any disclaimer, the term of this patent is extended or adjusted under 35 U.S.C. 154(b) by 763 days.

(21) Appl. No.: 13/189,914

(22) Filed: Jul. 25, 2011

(65) Prior Publication Data

US 2013/0031256 A1    Jan. 31, 2013

(51) Int. Cl.
*G06F 15/16* (2006.01)
*H04L 12/26* (2006.01)
*H04L 29/06* (2006.01)

(52) U.S. Cl.
CPC .............. *H04L 69/16* (2013.01); *H04L 69/14* (2013.01); *Y02B 60/33* (2013.01)

(58) Field of Classification Search
CPC ... H04L 29/08072; H04L 29/06; H04L 43/00; H04L 12/2602; H04L 41/22; G06F 17/30592; G06F 17/30563; G06F 17/30569; G06F 17/30595; G06Q 10/10
USPC .......................................... 709/227; 370/221
See application file for complete search history.

(56) References Cited

U.S. PATENT DOCUMENTS

| | | | | |
|---|---|---|---|---|
| 5,537,400 A | * | 7/1996 | Diaz et al. | ..................... 370/412 |
| 5,745,489 A | * | 4/1998 | Diaz et al. | ................. 370/395.7 |
| 7,020,836 B2 | * | 3/2006 | Beverly | ........................ 714/808 |
| 7,155,518 B2 | * | 12/2006 | Forslow | ........................ 709/227 |
| 8,018,840 B2 | * | 9/2011 | Bellur et al. | ................... 370/221 |
| 8,127,348 B2 | * | 2/2012 | Kivinen et al. | ................. 726/14 |
| 2003/0120743 A1 | * | 6/2003 | Coatney et al. | ............... 709/217 |
| 2003/0191799 A1 | * | 10/2003 | Araujo et al. | ................ 709/203 |
| 2006/0168265 A1 | * | 7/2006 | Bare et al. | ..................... 709/230 |

(Continued)

FOREIGN PATENT DOCUMENTS

| CN | 1832628 A | 9/2006 |
|---|---|---|
| JP | 2000124881 A | 4/2000 |

(Continued)

OTHER PUBLICATIONS

Hampel T Klein Alcatel-Lucent G: "Enhancements to Improve the Applicability of Multipath TCP to Wireless Access Networks; draft-hampel-mptcp-applicability-wireless-networks-00.txt", Internet Engineering Task Force, IETF; Standardworkingdraft, Internet Society (ISOC) 4, Rue Des Falaise, Jun. 15, 2011, pp. 1-25, XP015076456, [retrieved on Jun. 15, 2011] section 4.4.2.

(Continued)

*Primary Examiner* — Mahran Abu Roumi
(74) *Attorney, Agent, or Firm* — Kramer & Amado, P.C.

(57) ABSTRACT

Various embodiments provide a reliable session migration method and apparatus without requiring additional option headers to each packet or inducing transmission delay. This is achieved by utilizing aggregated checksums that facilitate session migration upon a migration event. Advantageously, some such embodiments may permit applications to continue when the endpoint device physically moves from one access network. Similarly, some such embodiments may allow dynamic migration access networks based on load, pricing or other factors. Moreover, some such embodiments may permit traffic to be split along multiple paths so as to increase the aggregate throughput.

21 Claims, 4 Drawing Sheets

(56) References Cited

U.S. PATENT DOCUMENTS

| | | | |
|---|---|---|---|
| 2008/0056137 A1* | 3/2008 | Ravindran et al. | 370/238 |
| 2008/0104259 A1* | 5/2008 | LeFevre et al. | 709/228 |
| 2010/0036861 A1* | 2/2010 | Srihari et al. | 707/101 |
| 2012/0226802 A1* | 9/2012 | Wu et al. | 709/224 |
| 2012/0259814 A1* | 10/2012 | Sasaki et al. | 707/645 |

FOREIGN PATENT DOCUMENTS

| | | |
|---|---|---|
| JP | 2000156674 A | 6/2000 |
| WO | PCT/US2012/043260 | 10/2012 |

OTHER PUBLICATIONS

Ford Roke Manor Research C Raiciu M Handley University College London O Bonaventure Universite Catholique De Louvain A: TCP Extensions for Multipath Operation with Multiple Addresses; draft-IETF-mptcp-multiaddressed-04.txt, standardworkingdraft, Internet Society (ISOC)4, Rue Des Falaise, CH-1205 Geneva, Switzerland, No. 4, Jul. 11, 2011 (Jul. 11, 2011), pp. 1-59, XP015077255, [retrieved on Jul. 11, 2011] sections 3.3 and 3.5.
Georg Hampel, Thierry Klein: "MPTCP Enhancements to Improve Applicability to Wireless Access Network", Jul. 27, 2011, XP55040854, Retrieved from the Internet: URL: www.ietf.org/proceedings/81/slides/mptcp-4.ppt [retrieved on Oct. 12, 2012] the whole document.

* cited by examiner

METHOD AND APPARATUS FOR RELIABLE SESSION MIGRATION

TECHNICAL FIELD

The invention relates generally to methods and apparatus for providing reliable session migration.

BACKGROUND

This section introduces aspects that may be helpful in facilitating a better understanding of the inventions. Accordingly, the statements of this section are to be read in this light and are not to be understood as admissions about what is in the prior art or what is not in the prior art.

There are numerous techniques supporting end-point migration of stream-oriented IP-based transport sessions across access networks. Some of these techniques perform session-endpoint migration above the transport layer by introducing an additional superseding sequence number and checksum scheme. Such superseding sequence numbers and checksums may be included in additional transport layer option headers that are applied across all data independent of the path they traverse. The superseding sequence number scheme allows ordering of packets that arrive from different paths. The checksum identifies if the packets have been delivered properly. As may be appreciated, including an additional transport layer option header in every packet adds substantial processing overhead and bandwidth inefficiency on the end nodes.

To reduce overhead, some other techniques hold back transmission until a checksum and range for an entire block of packets can be determined. As may be appreciated, this solution adds delay since all packets have to be held back on the transmit side to compute range and checksum before these values can be inserted on the first packet of the block.

SUMMARY

Various embodiments provide a reliable session migration method and apparatus without requiring additional option headers to each packet or inducing transmission delay. This is achieved by utilizing aggregated checksums that facilitate session migration upon a migration event. Advantageously, some such embodiments may permit applications to continue when the endpoint device physically moves from one access network to another. Similarly, some such embodiments may allow dynamic migration access networks based on load, pricing or other factors. Moreover, some such embodiments may permit traffic to be split along multiple paths so as to increase the aggregate throughput.

In one embodiment, a method and apparatus is provided for migrating from a first path to a second path in a stream-oriented communication session. The method includes setting the communication session to operate in a selected path mode over the first path and aggregating a first checksum of a stream of transmitted or received packets during the transmission or reception. The method further includes migrating the communication session to the second path based on a checksum match based on the first checksum.

In some embodiments, substantial portions of the plurality of packets do not contain the first checksum.

In some embodiments, the first and second paths are over disparate networks.

In some embodiments, the checksum match includes transmitting a selected path mode termination packet to another end node and receiving a checksum acknowledgement from the other end node. The selected path mode termination packet includes the first checksum.

In some embodiments, the selected path mode termination packet is a retroactive DSS packet. The retroactive DSS packet includes the first checksum, a current DSN and a current SSN.

In some embodiments, performing the checksum match further includes receiving a retransmission request from the other end node and retransmitting a portion of the plurality of transmitted packets to the other end node.

In some embodiments, setting the communication session to operate in selected path mode includes transmitting a selected path mode termination packet on the first path. The selected path mode termination packet includes a start checksum aggregation indicator, a current DSN and a current SSN.

In some embodiments, the apparatus is a mobile computing device.

In some embodiments, the apparatus is a networked host.

BRIEF DESCRIPTION OF THE DRAWINGS

Various embodiments are illustrated in the accompanying drawings, in which.

To facilitate understanding, identical reference numerals have been used to designate elements having substantially the same or similar structure and/or substantially the same or similar function.

DETAILED DESCRIPTION OF ILLUSTRATIVE EMBODIMENTS

Figure 1:
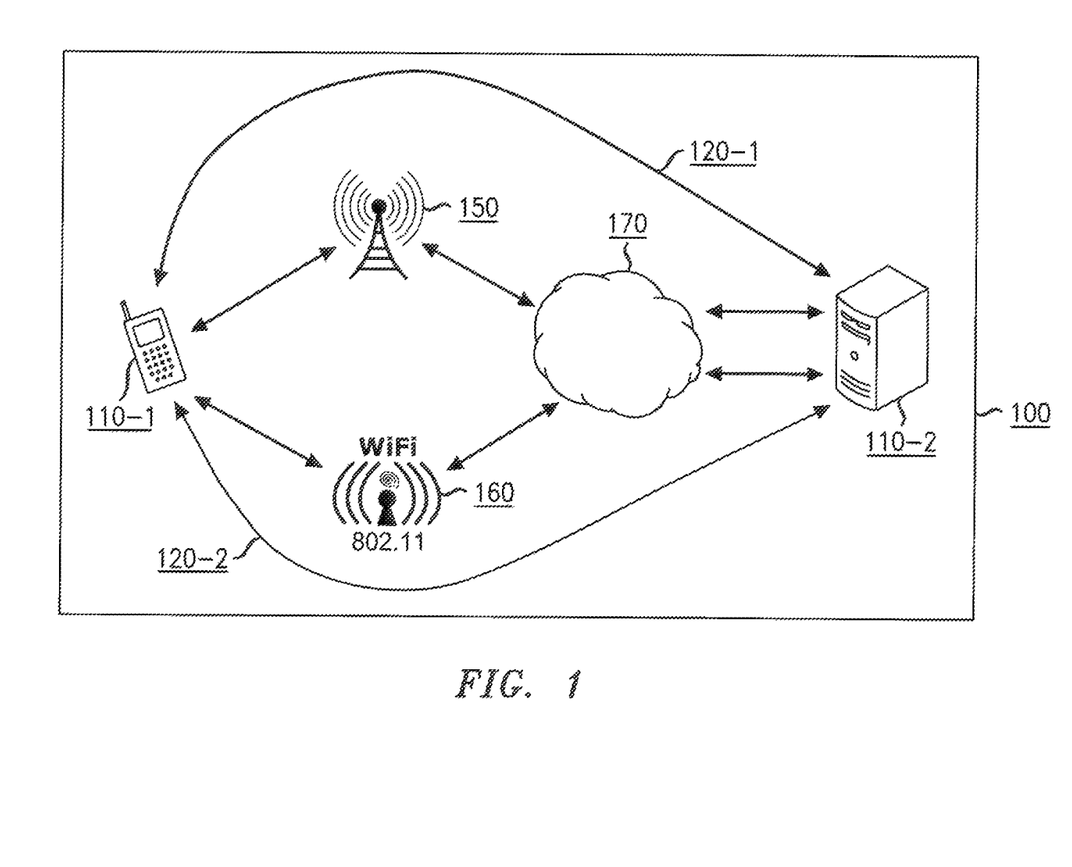
FIG. 1 illustrates an exemplary reliable transport session system.

FIG. 1 illustrates an exemplary reliable transport session system 100. Reliable transport session system 100 includes two end nodes 110-1 and 110-2 using a multipath communication protocol to communicate data between the two nodes. The multipath communication protocol supports endpoint migration of stream-oriented sessions across multiple paths 120-1 and 120-2.

The two end nodes 110-1 and 110-2 are configured to communicate packet data from one end node to the other via a stream-oriented transport mechanism. Stream-oriented transport mechanisms may include any suitable protocol such as TCP or SCTP to establish a stream-oriented session. Stream-oriented sessions may establish bi-directional communication between end nodes 110-1 and 110-2 and thus, at any point in time, either end node 110-1 or 110-2 may be the transmitter or receiver of the packet data.

Various access networks may be available to end node 110-1 to participate in a communication session with end node 110-2 to communicate session packet data. An example of two such paths is provided by paths 120-1 and 120-2. The communication session includes at least one stream-oriented transport session (i.e., flow) over each of paths 120-1 and 120-2. A multipath communication protocol overlays the stream-oriented transport sessions to control the reliable in-order delivery and assembly of packet data over the different flows. Paths 120-1 and 120-2 include access networks 150 and 160 that may directly route session packets to end node 110-1 or subsequently route packets through the internet cloud 170 to end node 110-2.

Session packets routed through access networks 150 and 160 and internet cloud 170 may be altered by middle boxes such as performance enhancing proxies and/or application layer gateways present in the networks. Such alteration of session packets change or affect the numbering schemes utilized by the multipath communication protocol to reliably reassemble the transmitted packet data arriving from the multiple flows. They may further change the content of the payload affecting the semantics of the information transferred. Therefore, the session end-point migration protocol must recognize if such data alteration has taken place when aligning the packets from various paths. In such event, the migration protocol may eventually discontinue the corresponding transport path or the connection altogether.

Advantageously, some embodiments may provide reliable session migration without requiring additional option headers or inducing transmission delay while still detecting when packets have been altered by middle boxes. Some of these embodiments may permit applications to continue when the endpoint device physically moves from one access network. Similarly, some of these embodiments may allow dynamic session migration across access networks based on load, pricing or other factors. Moreover, some of these embodiments may permit traffic to be split along multiple paths so as to increase the aggregate throughput.

In some embodiments, end node 110-1 and/or 110-2 is a mobile computing device. A mobile computing device may be any suitable mobile device such as: a mobile phone, a tablet, a computer, a personal digital assistant (PDA), a mobile gaming system, an e-reader and the like.

In some embodiments, end node 110-1 and/or 110-2 is a networked host. A networked host may be any suitable host such as: a single server and multiple servers in a cloud.

In some embodiments, paths 120-1 and 120-2 may include disparate access networks. Disparate access networks may include access networks such as: W-CDMA, LTE, UMTS, broadband networks and the like. For example, end node 110-1 may establish a CDMA wireless connection through a wireless access network 150 such as the wireless access network serviced by Verizon. In a further embodiment of this embodiment, on path 120-2, end node 110-1 may establish a WiFi connection through a broadband access network 160 such as the IP access network serviced by Comcast.

In some embodiments, the multipath communication protocol may be a conventional multipath protocol such as: multipath TCP (MPTCP) or multipath SCTP.

Figure 2:
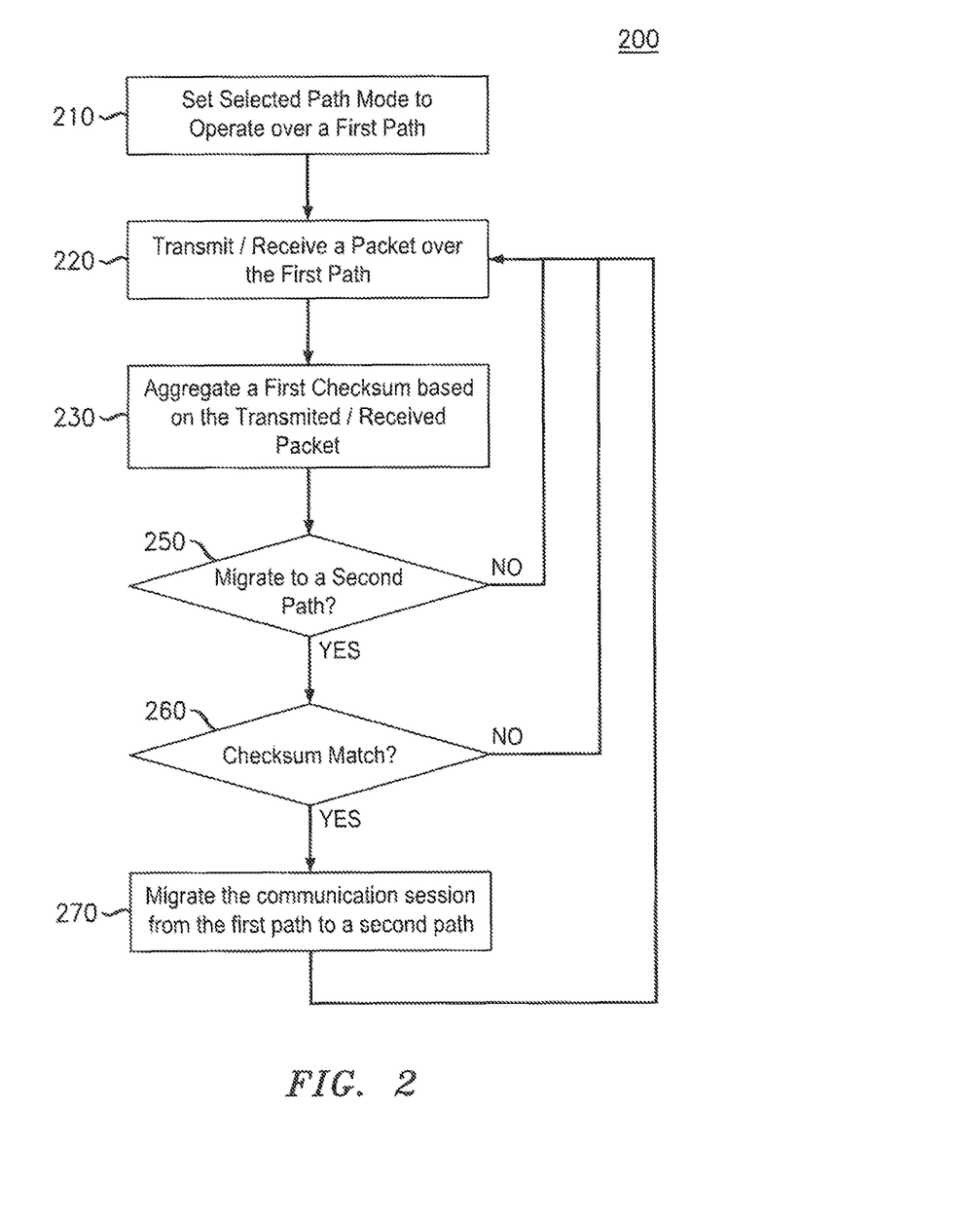
FIG. 2 depicts a flow chart illustrating an embodiment of a method for providing reliable transport session migration.

FIG. 2 shows a method 200 for providing reliable transport session migration as illustrated by the reliable transport session system 100 of FIG. 1. The method 200 includes setting an end node to operate in selected path mode over a first path (step 210). In selected path mode operation, the end node transmits or receives packets over the first path (step 220) and aggregates a first checksum of the transmitted/received packets (step 230) until the end node determines that the end node should be migrated to a second path (step 250) and verifies the checksum match (step 260). The end node then migrates the communication session from the first to the second path (step 270).

In the method 200, step 210 includes setting an end node to operate in selected path mode over a first path. Referring back to FIG. 1, end node 110-1 or 110-2 may announce the setting of the communication path to operate in a selected path mode over a first path by transmitting a first selected path mode initiation packet that includes a selected path mode initiation value. Upon agreement to switch to operate in a selected path mode, both the transmitting and receiving end nodes set their operational modes to selected path mode over the first path.

In selected path mode, all, or at least a portion, of the available paths may be alive; however, only one selected path is used for transmission and reception of the packet stream. The advantage to selecting only one path may be multifold such as: 1) to simplify reassembly, 2) other weaker paths may create "head-of-line blocking" due to dropped packet(s) since all other packets have to wait until lost one is retransmitted, 3) the other paths may be too expensive (e.g. due to interface charges), 4) multiple radios may have to be supported increasing costs such as increased battery power. It may be appreciated that other available paths may be used to transmit and/or receive packets from packet streams in other communication sessions.

It may be appreciated that either a transmitting or receiving end node may announce the setting of the communication path for operation in a selected path mode over a first path. It may be further appreciated that the protocol may allow for the end nodes to agree to set their operational modes to selected path mode based on the first selected path mode initiation packet without requiring further signaling. Advantageously, the protocol is configured so that further conventional multipath checksums and sequence numbers are not required to be added to a substantial fraction of the option headers in the communication session when in selected path mode. By "substantial fraction" is meant that only signaling packets require the aggregated checksum and multipath sequence numbers. For example, the selected path mode initiation packet and selected path mode termination packet (described herein) may contain additional checksum and multipath sequence number information in the option headers.

In the method 200, steps 220 and 230 include transmitting or receiving packets over the first path and aggregating a first checksum. The method 200 continues transmitting/receiving packets and aggregating checksums of the transmitted/received packets (steps 220 and 230) until the method determines that it should migrate to a second path (step 250). Advantageously, this technique of aggregating the checksum as the packets are transmitted/received obviates the need for any a priori knowledge about the sequence length of the data to be transmitted and it requires only one value (i.e., the aggregated checksum) to be cached by each end node for each flow direction.

Beginning with setting an end node to operate in selected path mode in step 210, sender and receiver end nodes each compute an aggregate checksum over all packets of the communication session until the selected path mode is terminated. For an end node on the transmit side, a checksum of the transmitted packet is determined and aggregated into the aggregated checksum value being stored by the transmit end node for the communication flow. For an end node on the receive side, a checksum of the received packet is determined and aggregated into the aggregated checksum value stored by the receive end node for the communication flow. Checksums may be aggregated in any suitable way such as: adding the current packet checksum to the aggregated checksum. In one embodiment, the aggregate checksum is built as a checksum over the per-packet checksums in the same way as the transport layer checksum is built as a checksum over the packet data.

It may be appreciated that the steps 220 and 230 may be performed in any order or performed in parallel.

In the method 200, steps 250 and 260 include determining whether to migrate the communication session from the first path to a second path. A migration determination is based on a migration event (step 250) and on a checksum match (step 260).

In the method 200, step 250 includes determining whether a migration event has been detected indicating a preference to switch from operating in selected path mode. A migration event may be a determination by the end node of a preference to switch out of the selected path mode of operation. The preference to switch from selected path mode may be based on environmental parameters; a received user message from a user interface; or a received message from the other end node. Environmental parameters may be signal strengths; cost parameters; latency values; bandwidth values; and/or the like of the available paths or information obtained from the congestion control of the currently active flow.

In the method 200, step 260 includes using a checksum match to determine that the communication session packets have not been altered. A checksum match is an indication that the first checksum aggregated by the end node matches a second checksum aggregated by the other end node (e.g., the numbers and values of the bytes contained in the packet have not been altered by middle boxes). The end node may determine the checksum match by transmitting its first checksum to the other end node and receiving an indication from the other end node that the checksums match. Alternatively, the end node may determine the checksum match by receiving the second checksum from the other end node and receiving an indication from an internal comparison that the checksums match. The checksum match step 260 verifies that the communication session packets have not been altered and that the communication session may therefore switch to another selected path or to multipath mode.

In the method 200, step 270 includes migrating the communication session from the first path to a second path. Once checksum match step 260 verifies the transmitted/ received packets, the end node may set the communication session to selected path mode over the second path. As described herein for step 210, an end node may announce the setting of the communication path to operate in a selected path mode over the second path by transmitting a first selected path mode initiation packet that includes a selected path mode initiation value.

In some embodiments, the end node may switch to operate in multipath mode before migrating to the selected path mode over the second path. However, it may be appreciated that until multipath mode has been verified in response to a successful outcome of the checksum match step 260, the end node transmitter may only allowed transmission of the subject block of packet data on the first path. Moreover, it may be further appreciated that the end nodes may communicate in multipath mode for a period of time before the switch to operate in selected path mode over the second path has been effectuated. In fact, the end node may decide to continue transmitting in multipath mode instead of switching to selected path mode over the second path.

It may be appreciated that the acts of determining to migrate (step 250), verifying a checksum match (step 260) and migrating to a second path (step 270) may be performed discretely or, advantageously, portions of each of the acts may be combined in a single process. For example, the migration event from step 250 may also be the checksum match indication of step 260. For example, if an end node receives the second checksum from the other end node, the receipt of the packet containing the second checksum may constitute the migration event, and the determination that the second checksum matches the first checksum may constitute the checksum indication.

After step 270, method 200 returns to step 220 to continue transmitting packets on the second path. Because method 200 is iterative, it may be appreciated that for a given transmission that has been migrated successfully, the "first path" referred to in the figure at step 220 may be identical with the "second path" to which a prior transmission was migrated.

In some embodiments of the method 200, step 210 includes using the conventional MPTCP multipath protocol. In this embodiment, the selected path mode initiation value of the first selected path mode initiation packet may be the DSS option with "infinity settings". In "infinity settings", the DSS option sets: the range=0; the checksum=0; and the current values of data sequence number (DSN) and subflow sequence number (SSN).

In some embodiments of the method 200, step 230 includes using a per-packet checksum that is already supplied by the underlying transport protocol such as TCP, SCTP, UDP and the like. In a further embodiment, step 230 uses the underlying transport checksum in the TCP header. Advantageously, the computation of the aggregate checksum is less expensive by using a per-packet checksum already present since the packet checksum need not be separately determined.

In some embodiments of step 250, 260 and/or 270, the end node may transmit a selected path mode termination packet including the first checksum to the other end node. It may be appreciated that either end node in the communication session may transmit the selected path mode termination packet.

In a further embodiment, the selected path mode termination packet may further include parameters related to the data range of the sequence or superseding numbering schemes. Advantageously, such parameters may provide, to an end node receiving data packets, information on how many packets are still outstanding, (e.g., due to packet loss), when the checksum-carrying packet arrives. In a further embodiment of this embodiment, the receiving end node may initiate a retransmission scheme on the first path or on another path.

In some embodiments of step 250, 260 and/or 270, the selected path mode termination packet may be sent on the second path. Advantageously, if the first path has become unavailable, the end nodes may be able to continue the communication session on the second path. It may be appreciated that as described herein, although only one path is utilized in selected path mode, the other paths are alive (though idle) and may be utilized. Advantageously, if the first path has become unavailable, the communication may still be verified and migrated to multipath mode or a second path.

Figure 3:
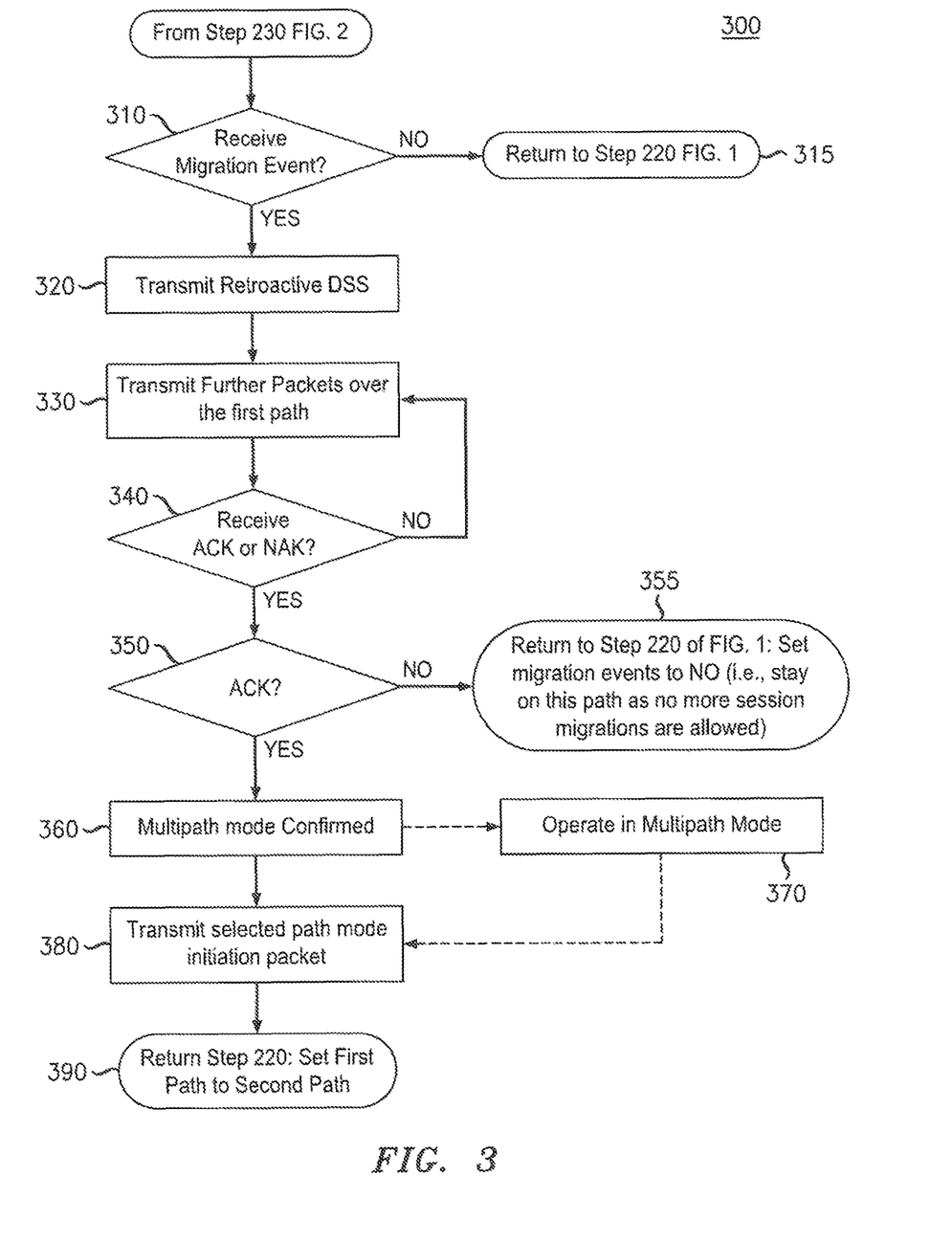
FIG. 3 depicts a flow chart illustrating a further embodiment of a method for providing reliable transport session migration according to FIG. 2.

FIG. 3 shows a method 300 for migrating the communication session from a first path to a second path in a further embodiment of steps 250, 260 and 270 of FIG. 2 using the conventional MPTCP multipath protocol. The method 300 includes the end node transmitting a packet with a retroactive DSS (step 320) upon receiving a migration event (step 310). If a migration event is not received or if migration events are set to no (i.e., not allowed), the method returns a "NO" and returns to step 220 of FIG. 1 (step 315). While waiting to receive an acknowledgement or failure message (step 340), the end node may transmit further packets on the first path (step 330). If a failure message is received, migration events are set to "NO" (i.e., no more session migrations are allowed) and returns to step 220 of FIG. 1 (step 355). If the end node receives an acknowledgement of the retroactive DSS (step 350), multipath mode is confirmed (step 360). The end node may then optionally remain in multipath mode with all paths available for transmission (step 370). While in multipath mode, the end node may transmit packets in multipath mode until the end node makes a determination to migrate to operate in selected path mode over the second path, or the end node may continue the communication session in multipath mode. Once the end node determines to migrate to selected path mode over the second path, the end node transmits a selected path mode initiation packet (step 380), sets the operation of the selected path mode to the second path and returns to step 220 of FIG. 1 (step 390).

In the method 300, step 310 includes receiving a migration event as already described herein. Additionally, migration events may be throttled. For example, migration events may be throttled if the end node has determined that a portion of the transmitted packets in the communication session have been altered (e.g., as determined by a previous checksum verification).

In the method 300, step 315 includes returning to step 220 of FIG. 1 if no migration events have been received.

In the method 300, step 320 includes transmitting a packet with a retroactive DSS. Since MPTCP does not have a mechanism that permits the end nodes to return to multipath mode from selected path mode (i.e., "Fallback Mode" in MPTCP), a new DSS option called "retroactive DSS" may be created. The retroactive DSS is a selected path mode termination packet requesting a switch from selected path mode back to multipath mode. This new DSS option is called "retroactive DSS" since it retroactively provides the checksum to multiple packets that have already been transmitted. The retroactive DSS holds the present DSN and SSN pertaining to the subflow. The checksum field contains the aggregated checksum while the range field is set to zero. The combination of non-zero checksum and zero-valued range indicates to the receiving end node that this is a "retroactive DSS".

In the method 300, steps 330 and 340 include transmitting further packets on the first path until the end node receives an acknowledgement or failure message from the other end node for the transmitted retroactive DSS. Since such further packets are not protected by the aggregate checksum, they each have to individually carry a transport header with their individual checksum. This allows the receiver to confirm that these latter packets have arrived unaltered. Further packets may be delivered including conventional multipath individual checksums. Moreover, since the checksums of the transmitted packets have not been verified (i.e., verifying that the packets have been delivered unaltered), the end node may restrict transmission to the first path.

In the method 300, step 350 includes determining if the received message from the other end node (step 340) is an acknowledgement or failure message. The acknowledgement message indicates that the sending and receiving end node aggregated checksums match and that the method proceeds to step 360. A failure message indicates that the sending and receiving end node aggregated checksums do not match and that the method proceeds to step 355. The failure message may be a non-acknowledgement of the retroactive DSS or a timeout for receiving a reply. For example, the failure message may be an MP_FAIL message.

In the method 300, step 355 includes restricting the end node to selected path mode over the first path due to the mismatched checksums, which indicate that the transmitted packets may have been altered. In some embodiments, a migration event parameter may be set to "NO" indicating that step 310 should throttle any subsequent attempt by the end node to migrate the communication session to selected path mode using a second path or to multipath modes.

In the method 300, step 360 includes determining the operative mode for the communication session upon acknowledgement of the retroactive DSS. The end node may: migrate the communication session to selected path mode using the second path (step 380); migrate the communication session to multipath mode (step 370) or any other suitable transmission mode (e.g., continue transmitting further packets over the first path, or return to selected path mode over the first path).

The method 300 optionally includes step 370. Step 370 includes migrating the communication session to multipath mode. In some embodiments, the end node may determine it would be beneficial to remain in multipath mode for all or a portion of the communication session. The end node may then determine to migrate the communication session to selected path mode over a second path. If the end node makes a determination to migrate to selected path mode over a second path, the method proceeds to step 380.

In the method 300, step 380 includes setting the end node to operate in selected path mode over the second path. Selected path mode is set using the DSS option with "infinity settings" as previously described herein. In some embodiments, the first path may be migrated to a second path. In other embodiments, the end node may determine to continue on the same path and reinstate selected path mode over the original first path. In this second embodiment, the first path and second path may be the same path.

In the method 300, step 390 includes returning the method to step 220 of FIG. 1. It may be appreciated that the operative first path of the method in the current transmission sequence will be set to the migrated second path of the prior transmission sequence.

In some embodiments of step 330, a receiver end node may estimate how many packets of the sequence are lost due to packet loss based on the DSN and SSN values in the retroactive DSS. The receiving end node may then use conventional subflow- or connection-level procedures to request retransmission of these packets. After reception of the missing packets, the receiver end node may then compare the aggregate checksum held in the retroactive DSS with the value of its own aggregated checksum and subsequently send an acknowledgement of the retroactive DSS.

Although primarily depicted and described in a particular sequence, it may be appreciated that the steps shown in methods 200 and 300 may be performed in any suitable sequence. Moreover, the steps identified by one box may also be performed in more than one place in the sequence.

It may be appreciated that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media.

The embodiments are also intended to cover computers programmed to perform said steps of the above-described methods.

Figure 4:
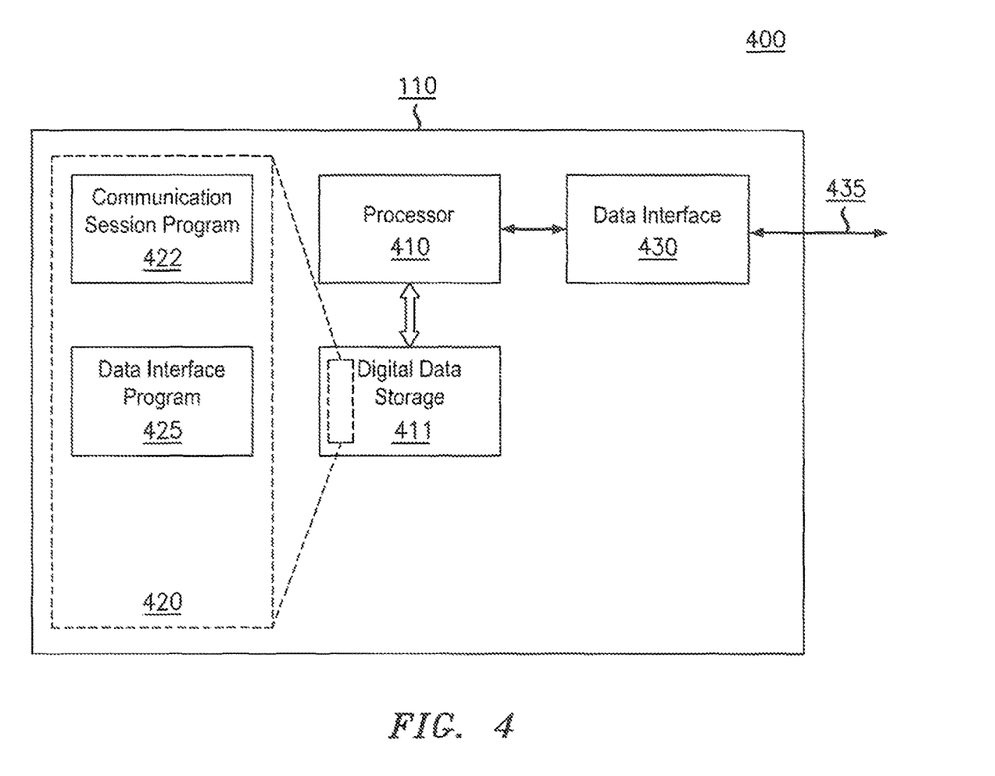
FIG. 4 depicts a block diagram schematically illustrating one embodiment of the end nodes 100-1 and/or 110-2 of FIG. 1.

FIG. 4 schematically illustrates functional blocks of one embodiment (i.e., end node 110) of end nodes 110-1 and 110-2 of FIG. 1. End node 110 may participate in a multipath communication session, e.g., using the methods 200 and optionally 300. The end node 400 includes a processor 410, a digital data storage 411 and a data interface 430.

The processor 410 controls the operation of end node 110. The processor 410 cooperates with the digital data storage 411 and data interface 430.

The digital data storage 411 stores aggregated checksum. The digital data storage 411 also stores programs 420 executable by the processor 410.

The processor-executable programs 420 may include a communication session program 422 and a data interface program 425. Processor 410 cooperates with processor-executable programs 420 to perform the steps of methods 200 and 300. For example, processor 410 may perform communication session steps of methods 200 and 300 by executing the communication session program 422. As such, communication session program 422 may be programmed to control all or portions of each of the steps of methods 200 and 300. Additionally, processor 410 cooperates with digital processor-executable programs 420 to control the end node 110. For example, processor 410 may execute the data interface program 425 to control data interface 430.

The data interface 430 is configured to retrieve or transmit data between end node 110 and the other end node via communication channel 435. Communication channel 435 may be any conventional communication path/communication protocol supporting data connectivity. Although depicted and described as a single communication channel 435, data interface 430 may be configured for supporting any suitable number of communication channels supporting any suitable number(s) of sessions (e.g., any suitable number of IP flows), as described herein. Communications channels may be directed between data interface 430 and/or any other suitable external source of communications, such as the other end node, via communication channel 435.

The data interface 430 may support the retrieval and transmission of data in various steps of the methods 200 and 300. For example: processor 410 may execute data interface program 425 to perform all or portions of steps 210, 220, 250 and 270 of method 200 and all or portions of steps 310, 320, 330, 340, 350, and 380 of method 300.

In some embodiments, the data interface 430 may support retrieving or transmitting data over one or more of the following communication channels 435: wireless communications (e.g., LTE, GSM, CDMA, bluetooth); femtocell communications (e.g., WiFi); packet network communications (e.g., IP); broadband communications (e.g., DOCSIS and DSL); and the like.

In some embodiments, end node 110 is a machine-executable program of instructions executing on a mobile computing device. A mobile computing device may be any suitable mobile device such as: a mobile phone, a tablet, a computer, a personal digital assistant (PDA), an e-reader and the like.

In some embodiments, end node 110 is a machine-executable program of instructions executing on a networked host. A networked host may be any suitable host such as: a single server and multiple servers in a cloud computing network.

Although depicted and described herein with respect to embodiments in which, for example, programs and logic are stored within the digital data storage and the memory is communicatively connected to the processor, it may be appreciated that such information may be stored in any other suitable manner (e.g., using any suitable number of memories, storages or databases); using any suitable arrangement of memories, storages or databases communicatively coupled to any suitable arrangement of devices; storing information in any suitable combination of memory(s), storage(s) and/or internal or external database(s); or using any suitable number of accessible external memories, storages or databases. As such, the term digital data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within the invention's spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable. by the implementer as more specifically understood from the context.

It may be appreciated that any block diagrams herein represent conceptual views of illustrative circuitry embodying the principles of the invention. Similarly, it may be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method for migrating from a first path to a second path in a stream-oriented communication session in a multipath communication system, the method comprising:

at a processor communicatively coupled to a digital data storage, setting the communication session to operate in a selected path mode over the first path;
transmitting or receiving, by the processor in cooperation with the digital data storage, a plurality of packets over the first path;
aggregating, by the processor in cooperation with the digital data storage, a first checksum based on the plurality of packets;
wherein aggregating occurs at least in part while transmitting or receiving;
performing, by the processor in cooperation with the digital data storage, a checksum match, the checksum match based on the first checksum; and
migrating, by the processor in cooperation with the digital data storage, the communication session from the first to the second path based on the checksum match.

2. The method of claim 1, wherein a substantial portion of the plurality of packets do not contain the first checksum.

3. The method of claim 1, wherein the first and the second path are over disparate access networks.

4. The method of claim 1, wherein the act of performing the checksum match comprises:
transmitting, by the processor in cooperation with the digital data storage, a selected path mode termination packet to another end node, the selected path mode termination packet comprising the first checksum; and
receiving, by the processor in cooperation with the digital data storage, a checksum acknowledgement from the other end node.

5. The method of claim 4, wherein the selected path mode termination packet is a retroactive DSS packet, the retroactive DSS packet comprising: the first checksum, a current DSN and a current SSN.

6. The method of claim 5, wherein the act of performing the checksum match further comprises:
receiving, by the processor in cooperation with the digital data storage, a retransmission request from the other end node; and
retransmitting, by the processor in cooperation with the digital data storage, a portion of the plurality of transmitted packets to the other end node.

7. The method of claim 1, wherein the act of setting the communication session to operate in selected path mode comprises:
transmitting, by the processor in cooperation with the digital data storage, a selected path mode termination packet on the first path, the selected path mode termination packet comprising a start checksum aggregation indicator, a current DSN and a current SSN.

8. The apparatus of claim 7, wherein a substantial portion of the plurality of packets do not contain the first checksum.

9. The apparatus of claim 7, wherein the first and the second path are over disparate access networks.

10. The apparatus of claim 7, wherein, for performing the checksum match, the processor and the digital data storage are further configured to:
transmit a selected path mode termination packet to another end node, the selected path mode termination packet comprising the first checksum; and
receive a checksum acknowledgement from the other end node.

11. The method of claim 10, wherein the selected path mode termination packet is a retroactive DSS packet, the retroactive DSS packet comprising:
the first checksum, a current DSN and a current SSN.

12. An apparatus for migrating a stream-oriented communication session from a first path to a second path in a multipath communication system comprising:
a digital data storage; and
a processor communicatively coupled to the digital data storage, the processor and the digital data storage configured to:
set the communication session to operate in a selected path mode over the first path;
transmit a plurality of packets over the first path;
aggregate a first checksum based on the plurality of packets;
wherein the first checksum is aggregated at least in part during the transmission of the plurality of packets;
perform a checksum match, the checksum match based on the first checksum; and
migrate the communication session from the first to the second path based on the checksum match.

13. The apparatus of claim 12, wherein the apparatus is a mobile computing device.

14. The apparatus of claim 12, wherein the apparatus is a networked host.

15. A non-transitory computer-readable storage medium storing instructions which, when executed by a computer cause the computer to perform a method for migrating a stream-oriented communication session from a first path to a second path in a multipath communication system, the method comprising:
at a processor communicatively coupled to a digital data storage, setting the communication session to operate in a selected path mode over the first path;
transmitting or receiving, by the processor in cooperation with the digital data storage, a plurality of packets over the first path;
aggregating, by the processor in cooperation with the digital data storage, a first checksum based on the plurality of packets;
wherein aggregating occurs at least in part while transmitting or receiving;
performing, by the processor in cooperation with the digital data storage, a checksum match, the checksum match based on the first checksum; and
migrating, by the processor in cooperation with the digital data storage, the communication session from the first to the second path based on the checksum match.

16. The digital data storage medium encoding a machine-executable program of instructions of claim 15, wherein a substantial portion of the plurality of packets do not contain the first checksum.

17. The digital data storage medium encoding a machine-executable program of instructions of claim 15, wherein the first and the second path are over disparate access networks.

18. The digital data storage medium encoding a machine-executable program of instructions of claim 15, wherein the act of performing the checksum match comprises:
transmitting, by the processor in cooperation with the digital data storage, a selected path mode termination packet to another end node, the selected path mode termination packet comprising the first checksum; and
receiving, by the processor in cooperation with the digital data storage, a checksum acknowledgement from the other end node.

19. The digital data storage medium encoding a machine-executable program of instructions of claim 18, wherein the selected path mode termination packet is a retroactive DSS packet, the retroactive DSS packet comprising: the first checksum, a current DSN and a current SSN.

20. The digital data storage medium encoding a machine-executable program of instructions of claim 19, wherein the act of performing the checksum match further comprises:

receiving, by the processor in cooperation with the digital data storage, a retransmission request from the other end node; and retransmitting, by the processor in cooperation with the digital data storage, a portion of the plurality of transmitted packets to the other end node.

21. The digital data storage medium encoding a machine-executable program of instructions of claim 15, wherein the act of setting the communication session to operate in selected path mode comprises:

transmitting, by the processor in cooperation with the digital data storage, a selected path mode termination packet on the first path, the selected path mode termination packet comprising a start checksum aggregation indicator, a current DSN and a current SSN.

* * * * *